July 20, 1948.    A. J. BOUTHILLER ET AL    2,445,509
FLOATING TOOL HOLDER
Filed Dec. 29, 1945
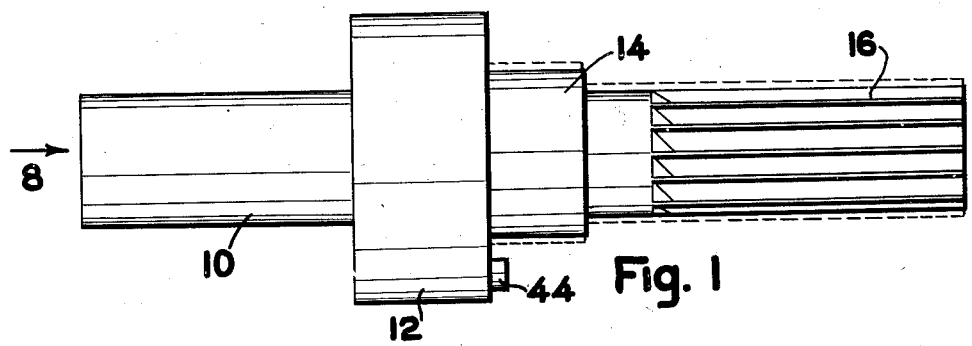
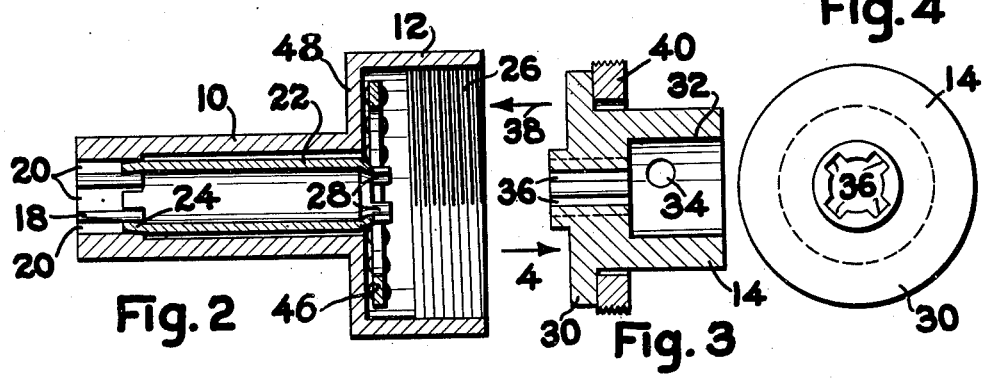
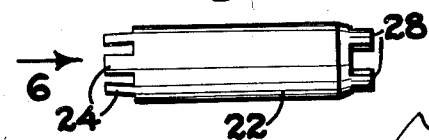
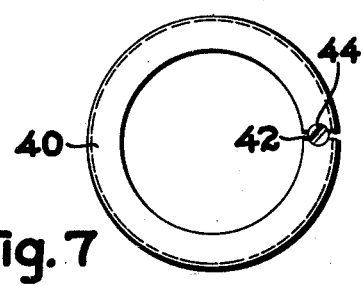
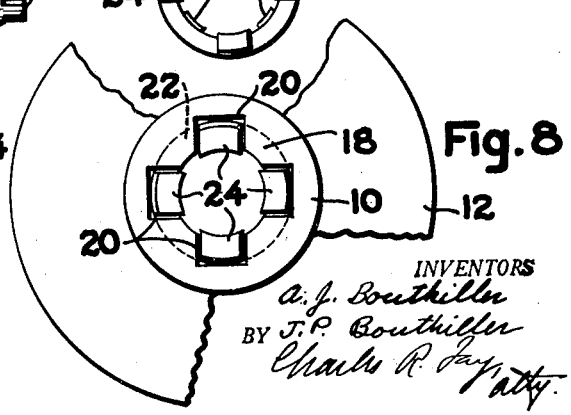
INVENTORS
A. J. Bouthiller
J. P. Bouthiller
BY Charles R. Fay
atty.

UNITED STATES PATENT OFFICE 2,445,509

FLOATING TOOLHOLDER

Auguste J. Bouthiller and Jean P. Bouthiller, Worcester, Mass., assignors to Imperial Machine Corporation, Worcester, Mass., a corporation of Massachusetts Application December 29, 1945, Serial No. 637,912

2 Claims. (Cl. 279—16)

This invention relates to new and improved floating tool holders for reamers, drills, etc., and the principal object of the invention resides in the provision of a tool holder permitting a complete free floating movement of the tool about 360° of rotation while still holding the tool firmly for the rotative working operation thereof and including means to prevent inclination of the tool relative to the holder.

Further objects of the invention include the provision of a hollow shank to be held in a chuck, said shank being loosely interiorly splined to a sleeve in the shank, the sleeve in turn being loosely splined to a tool holder or bushing, the bushing splines and the shank splines being arranged in offset relation in the direction of rotation, i. e., circumferentially, thereby insuring rotation of the bushing by means of the sleeve and complete floating of the bushing in any and all radial directions, and adjustable means holding the bushing parallel to the shank at all times.

Other objects and advantages of the invention will appear hereinafter.

Reference is to be had to the accompanying drawings, in which

Fig. 1 is a view in elevation of a floating tool holder according to the invention;

Figs. 2 and 3 comprise sectional views in separated forms of the entire device;

Fig. 4 is a view in end elevation of Fig. 3 looking in the direction of arrow 4;

Fig. 5 is a view in elevation of the sleeve;

Fig. 6 is an enlarged end view of the sleeve looking in the direction of arrow 6 in Fig. 5;

Fig. 7 is a view in elevation of the locking ring; and

Fig. 8 is an enlarged view in end elevation of the tool looking in the direction of arrow 8 in Fig. 1.

This invention comprises a socket 10 to be held in a chuck, said socket having an enlarged portion 12 to receive a bushing or tool holder element 14. In Fig. 1 a reamer 16 is shown and the universal movement of the tool 16 and the bushing 14 is illustrated in dotted lines to show the approximate relative movement of the parts.

The socket 10 is hollow and is provided with a restricted end portion at 18, this end portion being provided with a series of radial keyways 20. A sleeve 22 is located in the socket in spaced relation in a radial direction thereto. The sleeve 22 is provided at one end with a series of slightly inwardly directed splines or keys 24, there being as many splines or keys as there are keyways 20, and the former are adapted to enter the latter as shown in Figures 2 and 8 with a loose fit so that the sleeve 22 may have a wobbling motion in the socket 10. However, the sleeve is splined to the socket for rotary motion therewith.

The enlarged portion 12 of the socket is also hollow and is screw-threaded interiorly at 26. The sleeve 22 extends slightly into the enlarged portion 12 and terminates in a series of splines or keys 28 which are similar to those at 24 but are arranged at a rotative angle with respect thereto.

The bushing or tool holder 14 is provided with a flange 30 and is hollow as at 32 for the reception of the shank of a tool. A tapped hole 34 may be provided to hold the tool. The bushing 14 is provided with a series of keyways at 36 to receive the keys 28 to spline the bushing loosely to the sleeve 22 and the bushing as shown in Fig. 3 is received in the hollow enlarged portion 12 as by moving in the direction of arrow 38.

A threaded ring 40 having a split 42 and a screw 44 in the split secures the bushing 14 in the socket with any degree of frictional contact desired, thus avoiding undesired inclination of the tool. A thrust bearing of any desired type as at 46 is interposed between flange 30 of the bushing 14 and the rear wall 48 of the enlarged portion of the socket.

It will be seen that this device presents a tool holder which is universally movable with relation to the socket 10 by means of the sleeve 22 splined to the socket and also to the tool holding element 14 so that there may be relative radial movement of the sleeve and socket and also of the bushing 14 and the sleeve and this movement is universal in nature except for tool inclination.

Having thus described our invention and the advantages thereof, we do not wish to be limited to the details herein disclosed, otherwise than as set forth in the claims, but what we claim is:

1. A floating tool holder comprising a hollow socket having an open end, a long hollow sleeve loosely mounted therein, a loose splined connection between the sleeve and socket at corresponding ends thereof, a tool holding element, a loose splined connection between the latter and the sleeve at the open end of the socket, said socket and element each having a surface transverse of the axes thereof, positive means holding the tool holding element surface parallel to said socket surface, and a thrust bearing between the surfaces.

2. A floating tool holder comprising a hollow elongated socket having an enlarged hollow portion at the open end thereof, said enlarged portion providing an interior surface transverse to the axis of the socket, a separable tool holding element having a transverse surface receivable in the enlarged portion, a hollow sleeve connecting the socket and element for relative radial and non-rotational movement, positive means engaging the element to maintain said two surfaces parallel, and a thrust bearing between said two parallel surfaces.

AUGUSTE J. BOUTHILLER.
JEAN P. BOUTHILLER.

REFERENCES CITED

The following references are of record in the file of this patent:

UNITED STATES PATENTS

| Number | Name | Date |
|---|---|---|
| 1,398,679 | Clark | Nov. 29, 1921 |
| 2,007,897 | Skeel | July 9, 1935 |
| 2,010,587 | Fisher et al. | Aug. 6, 1935 |

FOREIGN PATENTS

| Number | Country | Date |
|---|---|---|
| 25,321 | Great Britain | May 1, 1902 |
| 106,736 | Great Britain | June 7, 1917 |